Feb. 9, 1954 J. I. BOTICKI 2,668,733
TONGS WITH WORK HOLDING JAWS
Filed Feb. 20, 1952 2 Sheets-Sheet 2

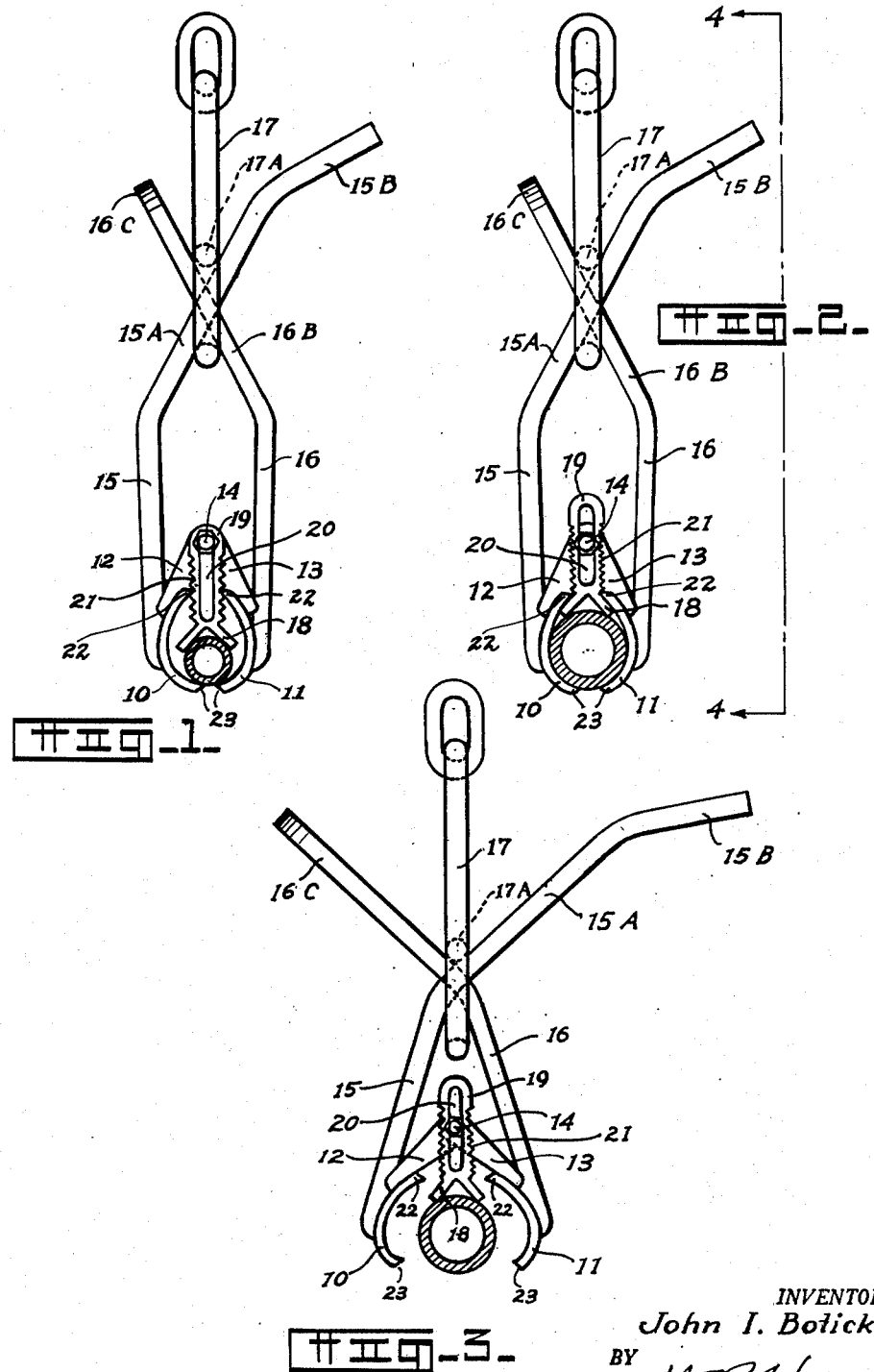

INVENTOR.
John I. Boticki.
BY
W. B. Harpman
ATTORNEY.

Patented Feb. 9, 1954

2,668,733

UNITED STATES PATENT OFFICE 2,668,733

TONGS WITH WORK HOLDING JAWS

John I. Boticki, Lake Milton, Ohio

Application February 20, 1952, Serial No. 272,660

6 Claims. (Cl. 294—118)

This invention relates to tongs and more particularly to tongs of the type normally carried by cranes and used in handling various articles such as pipes, tubes, rods, bars and the like.

The principal object of the invention is the provision of a tongs with work engaging and holding jaw constructions.

A further object of the invention is the provision of a simple and inexpensive tong construction incorporating movable and fixed jaw pieces.

A still further object of the invention is the provision of a tongs including cam means for exerting tension on an article in the jaws thereof.

The tongs disclosed herein comprise an improvement in the art relating to such devices in that they are provided with oppositely disposed jaws movable toward and away from each other and have a separate jaw piece movable therebetween so arranged as to automatically engage an article in the jaws and to be tensioned thereagainst by the closing action of the jaws.

The tongs are able to grasp an article automatically by being positioned thereover and allowed to move downwardly with respect thereto and upon being elevated will engage the article so as to hold the same firmly and under a degree of tension rendering the article incapable of accidental dislocation from the jaws of the tongs.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is an end view of the tongs in position on a small tubular article.

Figure 2 is an end view of the tongs in position on a relatively larger tubular article.

Figure 3 is an end view of the tongs in open position with respect to a tubular article.

Figure 4:
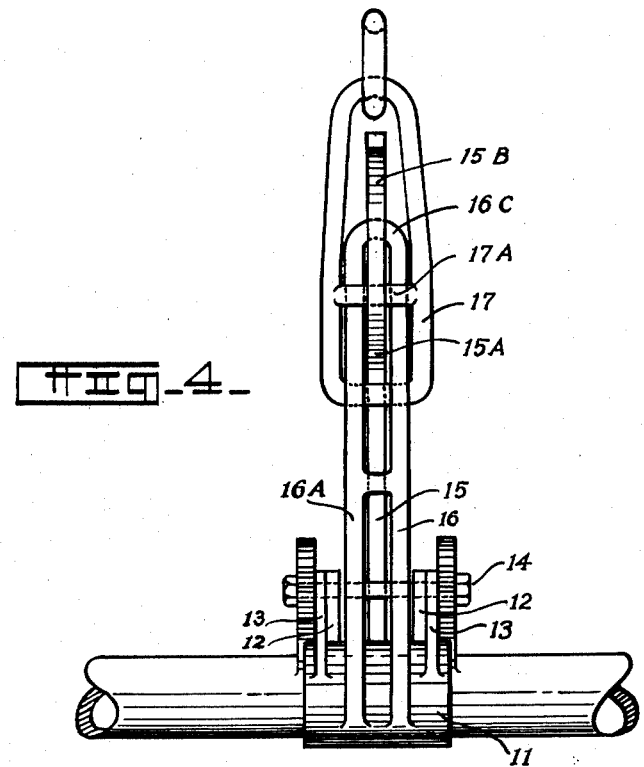
Figure 4 is a side view taken on line 4—4 of Figure 2.

By referring to the drawings and Figures 1 and 4 in particular it will be observed that the tongs comprise a pair of oppositely disposed, arcuate jaws 10 and 11, each of which has oppositely disposed, upwardly and inwardly inclined pairs of extensions 12 and 13, respectively. The extensions 12 and 13 are positioned on the jaws 10 and 11 so that their uppermost ends lie on a common longitudinally extending center line and the extensions 12 and 13 are, therefore, located in longitudinally spaced relation on the jaws 10 and 11, respectively.

The upper ends of the pairs of extensions 12 and 13 are apertured and a pivot bolt 14 is positioned longitudinally therethrough so that the jaws 10 and 11 are pivoted to one another thereby. The jaws 10 and 11 are also provided with vertically extending arms 15 and 16, respectively, the arm 15 preferably comprising a single thickness of metal formed with an inwardly inclined uppermost portion 15A which in turn is further inwardly inclined at its uppermost end as at 15B and which uppermost end 15B forms a manipulating handle. The inclined portion 15A of the arm 15 extends through the lower portion of an eyelet member 17 and beneath a transverse bar 17A thereof.

The upwardly extending arms 16 on the jaw 11 is formed of a pair of spaced sections of material 16 and 16A having their upper portions inturned in oppositely disposed relation to the inturned section 15A of the arm 15 and indicated in the drawings by the numeral 16B. The uppermost ends of the spaced arm 16 and 16A are joined by an inverted U-shaped end construction 16C and the inclined sections 16B pass through the eyelet member 17 below the transverse bar 17A thereof as will best be seen by referring to Figure 4 of the drawings. The inclined portion 15A of the arm 15 is positioned between the spaced portions 16 and 16A of the arm 16.

It will thus be seen that the arms 15 and 16 cross one another in the area of the eyelet 17, as best shown in Figures 1, 2 and 3 of the drawings, and that the lower portion of the eyelet 17 forms a pivot area for the arms 15 and 16 which enables them to be moved by raising and lowering the eyelet 17. For example, when the eyelet 17 is lowered, as shown in Figure 3 of the drawings, the transverse bar 17A will engage the upper surfaces of the arms 15 and 16 and cause them to move outwardly in opposite direction to one another, which motion will cause the jaws 10 and 11 to move away from one another.

When the eyelet 17 is moved upwardly, the lower part of the eyelet 17 will engage the lower surfaces of the arms 15 and 16 and cause them to move in an opposite direction thereby acting to close the jaws 10 and 11, as shown in Figures 1 and 2 of the drawings. Thus, the opening and closing of the jaws 10 and 11 may be controlled by raising and lowering the tongs and in practice this is achieved by raising and lowering the connecting portions of a crane carrying the tongs.

Figure 5:
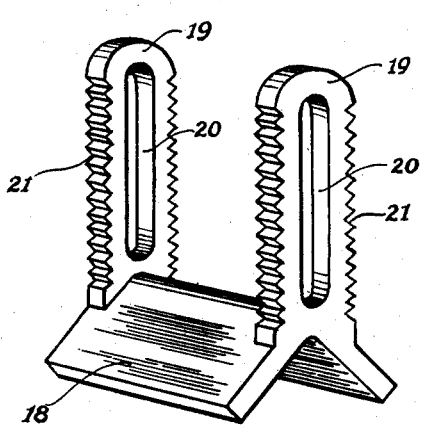
Figure 5 is an enlarged perspective view of a portion of the tongs shown in Figures 1 through 4.

In order that an article to be held by the tongs may be secured in the jaws 10 and 11, a clamping piece 13 is mounted between the jaws 10 and 11 and comprises an elongated body member of inverted V-shape in cross section having spaced vertical extensions 19—19 thereon which are provided with vertically positioned slots 20—20. The pivot bolt 14 heretofore referred to passes through the slots 20—20 in the extensions 19—19 and thereby secures the clamping piece 18 in the tong assembly. The outer opposite sides of each of the extensions 19—19 are provided with rack-like cam surfaces 21—21 (as best shown in Figure 5 of the drawings) and the upper innermost opposed portions of the jaws 10 and 11 are pointed as at 22—22 for registry with the rack-like cam surfaces 21—21 on the extensions 19—19 of the clamping piece 18.

It will thus be seen that when the jaws 10 and 11 are widely apart, as shown in Figure 3 of the drawings, the clamping piece 18 is free to move vertically and it will therefore engage any article over which the jaws 10 and 11 are positioned. For example, when a smaller article such as shown in Figure 1 is to be engaged by the tongs, the jaws 10 and 11 are lowered thereagainst and permitted to slide downwardly over the opposite sides of the article, which action occurs by reason of the angular formation of the lower outer portions 23—23 of the jaws 10 and 11.

As the jaws 10 and 11 move downwardly and apart, the pointed ends 22—22 of the jaws 10 and 11 disengage the rack-like cam surfaces 21—21 and permit the clamping piece 18 to move downwardly into engagement with the upper surface of the article being engaged. Vertical movement of the tongs will then cause the lower portion of the eyelet 17 to engage the arms 15 and 16 and move them upwardly and pivot the jaws 10 and 11 toward one another thereby closing them on the article and at the same time engaging the pointed ends 22—22 of the jaws on the appropriate cam surfaces of the rack-like cams 21—21. This action tensions the clamping piece 18 against the article being engaged and holds it securely against the lower portions of the jaws 10 and 11 which have moved beneath the article. This same operation takes place regardless of the size or shape of the article being engaged and it will be observed that it is entirely automatic.

It will thus be seen that an article such as a section of pipe, as illustrated in the several figures of the drawings, may be engaged by the tongs clamped therein by the clamping piece 18 and safely transported by the crane carrying the tongs with no danger of the pipe becoming disengaged and rendering the heretofore believed necessary chains, cables, etc., entirely unnecessary.

It will thus be seen that the several objects of the invention have been met by the tongs with work holding jaws disclosed herein.

Having thus described my invention, what I claim is:

1. In a tongs with work holding jaws for handling pipes and the like, a pair of cooperating jaws and a pivot for pivotally connecting said jaws together, a pair of tong arms affixed to said jaws below said pivotal connection, said tong arms loosely connected together above said pivotal connection and clamping means movably disposed between said jaws on said pivot, stationary formations on said jaws for registry with said clamping means when said jaws are closed.

2. The tongs with work holding jaws set forth in claim 1 wherein said jaws are arcuate in shape with the upper innermost edges thereof pointed to define said formations engageable with said clamping means.

3. The tongs with work holding jaws set forth in claim 1 and wherein the clamping means comprises a body member having vertical slotted extensions thereon slidably engaged on the pivot portions of said jaws and having cam racks on their opposite outer edges.

4. In a tongs having work engaging jaws, a pair of oppositely disposed arcuate jaws, inwardly and upwardly formed extensions thereon, a pivot connecting said extensions to one another, tong arms positioned on said jaws below said extensions and extending upwardly with respect thereto and crossed thereabove, an eyelet about said tong arms at their point of crossing, a clamping member having slotted vertical extensions thereon loosely positioned between said jaws and engaged on said pivot, cam racks on the opposite outer sides of said vertical extensions and fixed cam rack engaging formations on said jaws.

5. The tongs with work holding jaws set forth in claim 4 wherein the tong arms comprise one arm on one jaw and a spaced pair of arms on the other jaw with said one arm passing between said spaced pair of arms at their point of crossing.

6. The tongs with work holding jaws set forth in claim 4 and wherein said eyelet has a transverse bar dividing it into upper and lower portions and wherein said tong arms are crossed and positioned through said eyelet below said transverse bar.

JOHN I. BOTICKI.

References Cited in the file of this patent

UNITED STATES PATENTS

| Number | Name | Date |
|---|---|---|
| 715,746 | Boax | Dec. 16, 1902 |
| 1,753,181 | Grinnel | Apr. 1, 1930 |

FOREIGN PATENTS

| Number | Country | Date |
|---|---|---|
| 185,588 | Great Britain | Sept. 14, 1922 |